United States Patent
Morrow et al.

(10) Patent No.: US 7,192,155 B2
(45) Date of Patent: Mar. 20, 2007

(54) AIRFIELD EDGE-LIGHT UTILIZING A SIDE-EMITTING LIGHT SOURCE

(75) Inventors: Glenn Morrow, Westerville, OH (US); Eric Darwin, Columbus, OH (US); Alan Glenn Glassner, Columbus, OH (US)

(73) Assignee: Siemens Airfield Solutions, Columbus, OH (US)

( * ) Notice: Subject to any disclaimer, the term of this patent is extended or adjusted under 35 U.S.C. 154(b) by 135 days.

(21) Appl. No.: 10/931,192

(22) Filed: Aug. 31, 2004

(65) Prior Publication Data

US 2006/0050507 A1    Mar. 9, 2006

(51) Int. Cl.
*E01F 9/00* (2006.01)

(52) U.S. Cl. .................... 362/153.1; 362/244

(58) Field of Classification Search ............ 362/153.1, 362/800, 340, 244
See application file for complete search history.

(56) References Cited

U.S. PATENT DOCUMENTS

| 1,853,321 | A | * | 4/1932 | Rogers ..................... 340/953 |
| 6,217,195 | B1 | * | 4/2001 | Turner et al. .............. 362/276 |
| 6,425,678 | B1 | | 7/2002 | Verdes et al. |
| 2002/0114170 | A1 | * | 8/2002 | Chen et al. ................ 362/559 |
| 2003/0193807 | A1 | * | 10/2003 | Rizkin et al. .............. 362/317 |
| 2004/0114355 | A1 | * | 6/2004 | Rizkin et al. .............. 362/153 |

OTHER PUBLICATIONS

GSI-LED-861-T; LED Elevated Taxiway Edge Light.
Point Obstruction Lights Pol Let Pointspec Series, Point Lighting Corpooration, Bloomfield, CT.
Pro III TCL, Taxiway Centerline Light -LED, Cooper Crouse Hinds Airport Lighting Products, Windsor, CT.
TEL Taxiway Edge Light -LED, Cooper Crouse Hinds Airport Lighting Products, Windsor, CT.
Specification for Obstruction Lighting Equiptment, Advisory Circular, U.S. Department of Transportation, Oct. 19, 1995.
Specification for Runway and Taxiway Light Fixtures, Advisory Circular, U.S. Department of Transportation, Sep. 1, 1998.
http://www.gsilight.com/ledsys1.htm, G.S.I. Inc.: LED Lighting Systems (Godfrey Systems International) LED Lighting System, Aug. 27, 2004.
Cooper Crouse-Hinds, Airport Lighting Products, PRO III™ TCL Taxiway Centerline Light—LED, pp. 1-23 & 1-24.
Point Lighting Corporation, Point Obstruction Lights, POL LED PointSpec® Series, Aug. 2004.
Siemens, Signature Series™, L-810 LED Obstruction Light, p. A-9.
Siemens, Signature Series™, L-861T LED Elevated Taxiway Edge Light, p. A-3-A-4.
Siemens, Signature Series™, L-852T Style 3 LED Taxiway Edge Light, p. A-7-A-8.
Cooper Crouse-Hinds, Airport Lighting Products, TELTaxiway Edge Light-LED, p. 2-13-2-14.

* cited by examiner

*Primary Examiner*—Renee Luebke
*Assistant Examiner*—Julie A. Shallenberger

(57) ABSTRACT

A runway, taxiway or obstruction fighting system having at least one side emitting LED mounted on a base. A cover is optically coupled to the side emitting LED to direct fight at a desired angle from a horizontal plane extending from the base. The cover is manufactured to have the highest transmissivity when used with a monochromatic LED light source. The color of the material is tuned to the wavelength of the LED light source to obtain the maximum light output. A heater circuit is included in the lighting system wired in series with the side emitting LED. A constant current source is employed to supply power to the side emitting LED and heater circuit so that operation of the heater circuit does not affect the intensity of the light from the side emitting LED.

23 Claims, 6 Drawing Sheets

AIRFIELD EDGE-LIGHT UTILIZING A SIDE-EMITTING LIGHT SOURCE

CROSS REFERENCE TO RELATED APPLICATIONS

The present system is related to U.S. patent application Ser. No. 10/096,440 by Hansler et al. entitled "Elevated Airfield Runway and Taxiway Edge-Lights utilizing Light Emitting Diodes" filed on Mar. 12, 2002 and which claims priority from U.S. Provisional Patent Application Ser. No. 60/278,766, filed on Mar. 26, 2001, the entirety of which is hereby incorporated by reference.

BACKGROUND OF THE INVENTION

This invention is related to airfield lighting (e.g. runway, taxiway and obstruction), and more particularly, to a side-emitting lighting system utilizing a side-emitting Light Emitting Diode (LED).

Airport edge lighting has been in existence for many years utilizing incandescent lighting technology. Conventional designs that utilize incandescent lights have higher power requirements, lower efficiency, and low lamp life which needs frequent, costly relamping by maintenance professionals.

Some airfield-lighting manufacturers are using more efficient devices such as LEDs where the LEDs are arranged in multiple rings shining outward. Optics of some sort are then used to concentrate the light in the vertical and horizontal directions to meet Federal Aviation Administration (FAA) specifications.

Recently, implementations utilizing top emitting LEDs have been introduced which require additional light directing components as well as costly reflection and/or refraction techniques in order to comply with current FAA specifications and predetermined criterion.

What is needed is an airfield edge-lighting system that can utilize as few as one LED in a more efficient manner more efficiently while meeting the required FAA standards.

SUMMARY OF THE INVENTION

The present invention, in accord with an aspect disclosed herein, comprises a runway, taxiway or obstruction lighting system. The lighting system includes a housing and a light assembly in communication with the housing. The light assembly includes a base with a top surface and a bottom surface whereby the bottom surface of the base is in communication with the housing, a side-emitting light emitting diode positioned on the top surface of the base, and a cover suitably capable of transmitting light, the cover disposed around the side-emitting light emitting diode and in communication with the housing.

An aspect of the present system includes an electrical circuit for operatively controlling an intensity of the light emitting diode in accordance with a predetermined criteria (e.g. FAA requirements). The electrical circuit may also suitably allow for retrofitting the present light assembly into an existing incandescent lighting system.

In one embodiment, a single side-emitting light emitting diode (LED) is provided and suitably adapted to emit light according to a predetermined criterion. Additionally, the side-emitting LED may be suitably adapted to emit light approximately 0 to 6 degrees from a horizontal plane parallel with a mounting surface. As well, the system may be configured such that the light is dispersed from the side-emitting LED in a 360-degree pattern.

An alternative embodiment of the present invention employs multiple side emitting LED's to realize the higher photometric requirements for obstruction lights.

Further embodiments include a base configured to function as a heat-sink. Yet another embodiment has a heating element disposed within the cover and in close communication with the light assembly. The heating element may be configured with a thermostat for controlling the heating element.

Other embodiments include a cover that is cylindrical in shape. Also, the cover may be tinted or colored (e.g. blue for taxiway edge lighting applications). Further, the cover may include a lens for refracting light emitted from the LED in accordance with a predetermined criterion.

Still more embodiments may include an extension connected to the housing for elevating the light assembly above a mounting surface, whereby the light assembly and the extension are in a substantially vertical alignment. As well, the extension may include a frangible portion that fractures according to predetermined criterion.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

The following includes examples of various embodiments and/or forms of components that fall within the scope of the present system that may be used for implementation. Of course, the examples are not intended to be limiting and other embodiments may be implemented without departing from the spirit and scope of the invention.

The Federal Aviation Administration (FAA) standards provide guidelines for the manufacture and implementation of airfield edge-lighting systems. Specifically, the FAA standards provide guidelines for the intensity and directional projection of light used in airfield lighting applications. The content and guidelines of the FAA specifications, including but not limited to Advisory Circular (AC) 150/5345-43E dated Oct. 19, 1995 and Advisory Circular 150/5345-46B dated Sep. 1, 1998 are hereby incorporated into this specification by reference in its entirety.

The present innovation is generally directed toward an LED lighting assembly. More specifically, one embodiment of the present innovation is directed toward a lighting assembly utilizing a side-emitting light source (e.g. side-emitting light emitting diode (LED)) for use in airport and airfield edge and obstruction lighting applications. For example, aspects of the present invention include a lighting assembly utilizing a side-emitting light source that is compliant with one or more of FAA specifications for L-810 Obstruction Light (AC 150/5345-43E and the FAA LED Engineering Brief document 2004), L-852T LED Taxiway Edge Light (AC 150/5345-46B and FAA LED Engineering Brief document 2004), and L-851T LED Elevated Taxiway Edge Light (AC 150/5345-46B and FAA "LED Engineering Brief document 2004").

The FAA standards stipulate that a taxiway edge lighting apparatus must meet certain photometric criterion. For example, the current FAA specification mandates that the light intensity projected from the lighting element must be at least 2.0 candela (a unit of luminous intensity) between 0 and 6 degrees from the horizontal axis (the horizontal axis being perpendicular to the longitudinal axis of a mounting rod), and a minimum of 0.2 candela between the remaining angle of 6 and 90 degrees from the horizontal axis.

One embodiment of the disclosed lighting system is in accordance with the current FAA requirements for taxiway edge lighting. It will be appreciated that the present system may be suitably configured to accommodate alternate and/or future predetermined criteria (e.g. intensity, angle of projection) and/or specifications.

Figure 1:
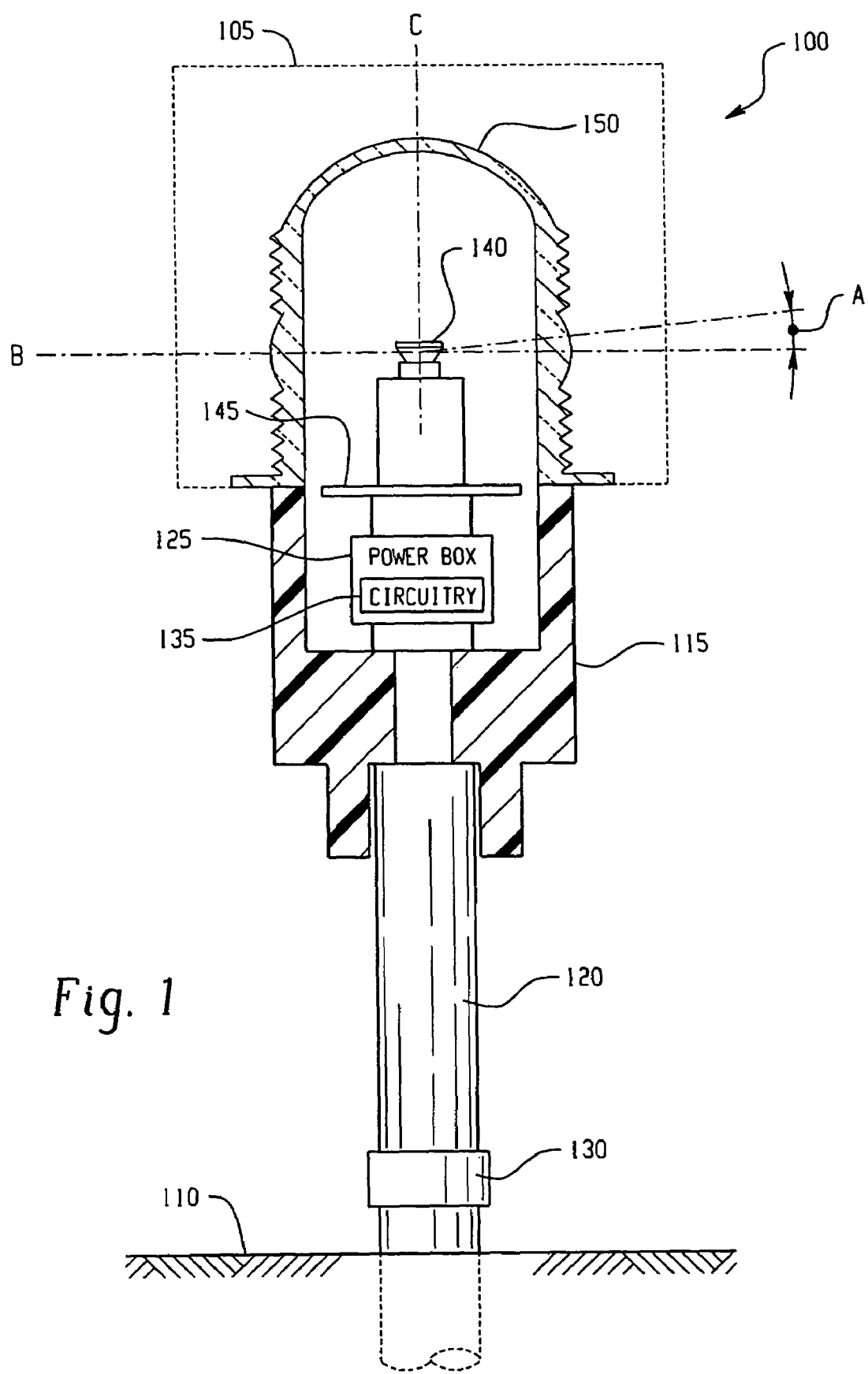
FIG. 1 illustrates an elevated edge-light system, according to a disclosed embodiment.

Referring now to FIG. 1, there is illustrated an elevated edge-light system 100, according to a disclosed embodiment. Generally, the system 100 comprises a light assembly 105 elevated above the surface of the ground 110. The light system 100 includes a light assembly 105, a housing 115 that may be secured at its base to a support structure 120 (e.g., an aluminum pipe extension). As shown, the support structure 120 may include a frangible portion 130 in accordance with a predetermined criterion.

As illustrated in FIG. 1, a source of power may be suitably provided from power elements located inside a power box 125. Additionally, circuitry 135 may be provided in order to enable the operation of the present system 100 to comply with predetermined criterion. In operation, the output of the electrical circuit element 135 may be operatively configured to supply the required power to light assembly 105. In operation, power from the output of the electrical circuit 135 may be carried across one or more wires (not shown) to light assembly 105 to illuminate a light source 140.

Although the disclosed embodiment of FIG. 1 illustrates the power box 125 and circuitry 135 located within housing 115, a skilled artisan will appreciate that the components may be disposed in any location without departing from the operation and scope of the present innovation. For example, the power box 125 and circuitry 135 may be located in alternate locations such as within support structure 120, remotely in-ground 110 or the like without departing from the spirit and scope of the present innovation.

Preferably, light assembly 105 includes a single side emitting LED 140 as a light source, a mounting base 145 to support the side emitting LED 140 and a cover 150 for transmitting the light from the side-emitting LED. To comply with FAA regulations, the single side emitting LED 140 has a minimum light output of approximately 20–30 lumens.

An advantage of using an LED as opposed to an incandescent bulb is that an LED has a much longer life cycle. A typical LED has a life of 56,000 hours when operated at high intensity, and 150,000 hours (the equivalent of 34 years when operated 12 hours a day) when operated at medium intensity.

It will be appreciated that the mounting base 145 may be suitably configured to function as a heat sink (e.g., ¾ inch aluminum) such that heat is transferred from the LED assembly 140 to the housing 115 and other attached structures to prolong the operating life of the LED assembly 140.

It will be appreciated that the mounting base or heat sink 145 may be suitably attached to the housing 115 by conventional means while utilizing a thermal grease or comparable material between the mounting base 145 and the housing 115 to facilitate heat transfer from the LED assembly 140 to the housing 115, and also between the LED assembly 140 and the mounting base 145 for the same purpose.

It will be appreciated that the single side-emitting diode 140 of the embodiment may be any side-emitting light source known in the art. For example, a Luxeon™ Star or provided by Lumileds Lighting, LLC, 370 West Trimble Road San Jose, Calif., 95131 may be utilized in accordance with the disclosed embodiments. Preferably, the LED has a minimum light output of 20–30 lumens.

The side-emitting LED 140 may be suitably configured to emit light in a 360 degree pattern. For example, the side emitting LED 140 may be suitably configured to emit light corresponding to an angle A 0 to 6 degrees above a horizontal plane B perpendicular with the optical axis C. It will be appreciated that the angle A may be adjusted in accordance with any desired lighting effect. It will be appreciated, that any desired beam pattern may be achieved by utilizing any number of optical techniques. For example, optical manipulating techniques such as depressions and/or apex angles may disposed within the cover 150 in order to refract and/or reflect the light to correspond to any desired beam pattern or predetermined criterion or standard. As well, alternate side-emitting light sources 140 may be configured to alter the beam pattern in accordance with desired criterion. Additionally, in accordance with a predetermined criterion, the light intensity from 6 degrees from horizontal to the optical axis C may be arranged to be 0.2 candela.

Although the embodiment utilizes a glass cover 150, it will be appreciated that other translucent materials capable of transmitting light known in the art may be used without departing from the present lighting system 100. For example, the cover 150 may be constructed of materials including, but not limited to, plastic, composites or the like.

In accordance with an aspect of the present invention, cover 150 is manufactured to have the highest transmissivity when used with a monochromatic LED light source. The color of the material (e.g., glass) is tuned to the wavelength of the LED light source to obtain the maximum light output. For example a blue cover and a LED for a taxiway light, a red cover and red LED for an obstruction light.

The support structure 120 may suitably secure to the mounting base 115 to provide a stable support for the light assembly 105 during harsh weather conditions or other conditions impacting operation and/or orientation of the lighting system 100. The support structure 120 may suitably elevate light assembly 105 above the surface of the ground 110 wherein the light assembly 105, support structure 120, and power box 125 are in a substantially vertical alignment. Although the embodiment shown is vertically orientated, an artisan will appreciate that other alternate configurations such as a flush fixture, of the present system may be utilized without departing from the scope of the present system.

An adjustment means (not shown) may be provided at the junction of the base of the housing 115 and the support structure 120 so that the longitudinal axis C (i.e., the optical axis) of the light assembly 105 may be adjusted to be maintained in a substantially vertical orientation. It will be appreciated that any adjustment means known in the art may be used without departing from the scope of the present lighting system 100.

As shown, the support structure 120 may suitably include a frangible section 130 which may function as an easy breakaway of the light assembly 105 and upper end of the support structure 120 if, for example, an aircraft, maintenance vehicle, or other forces exert a predetermined pressure on the frangible section 130 sufficient to cause breaking thereof.

It will be appreciated that any breakaway technique known in the art may be used to accomplish the frangible characteristics. For example, the frangible section 130 may comprise a groove scored into the support structure 120, which groove is designed with a sufficient length, depth, and orientation in the support structure 120 to facilitate separation of the light assembly 105 and upper end of the support structure 120 from the power box 125 at or near the surface of the ground 110. For example, where a threaded pipe extension is utilized as the support structure 120, the frangible section 130 may be a groove scored into the pipe surface, which pipe is a single piece of pipe extending from the light assembly 105 to the power box 125.

Alternatively, the frangible section 130 may also suitably comprise a compressed powderized metal coupler (not shown) designed to separate under predetermined stress parameters utilized in accordance with the particular application.. In any case, the function of the frangible connection 130 may be suitably configured to facilitate a breakaway function under stressed conditions to protect the lighting system 100 and the aircraft or other vehicle that may impact the lighting system 100 from damage.

The power box 125 may suitably and operatively couple power from a power feed (not shown) extending, for example, through an in-ground conduit (not shown) to one or more of the lighting systems 100. In the embodiment, the power box 125 may suitably include an electrical circuit element 135 configured to control the photometric characteristics of the light source 140 in accordance with a predetermined criteria (e.g. FAA standards).

Additionally, the electrical circuit element 135 may be designed to enable the retrofit of lighting system 100 into a conventional or standard incandescent lighting system. In other words, circuitry 135 may be provided to enable a variety of light sources 140 (e.g. side-emitting light emitting diode) to provide light intensity in accordance with a predetermined criteria (e.g. FAA specifications).

It will be appreciated that the support structure 120 to elevate the light assembly 105 above the ground as illustrated is optional. For example, the light assembly 105 may be suitably operable such that the base 145 of the light assembly 105 may be situated on or close to the ground surface 110. Alternatively, the light assembly 105 can be positioned in the ground such that only the cover 150 sufficiently protrudes to provide the required output light in accordance with desired criterion.

Figure 2:
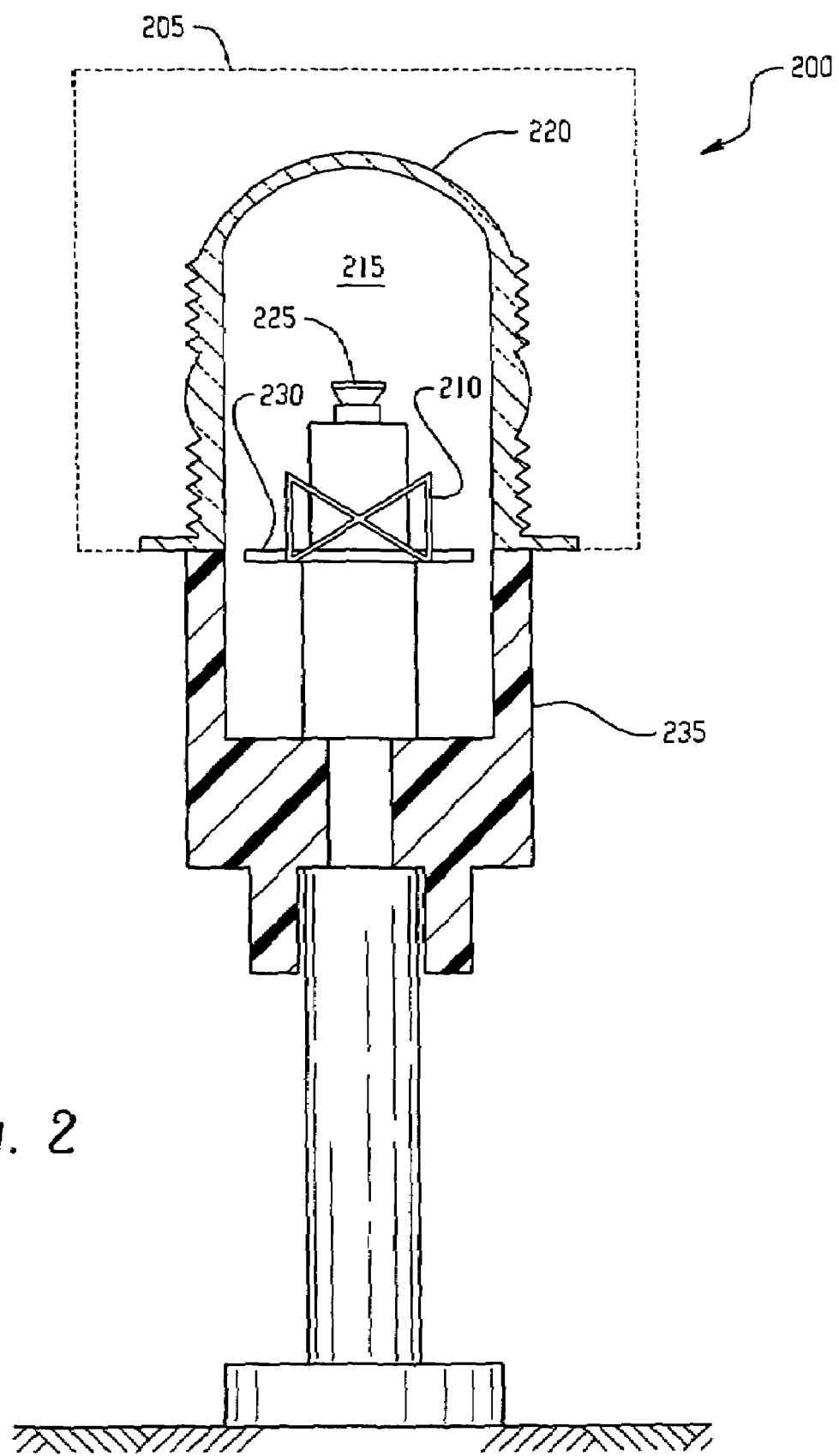
FIG. 2 illustrates an elevated edge-light system, according to an alternate disclosed embodiment.

Referring now to FIG. 2, there is illustrated a lighting system 200 in accordance with an alternate embodiment. As shown, lighting assembly 205 may optionally include a heating element 210 to provide heat to a light source chamber 215. As illustrated, light source chamber 215 is the space formed around a light source 225 (e.g. LED) and defined by an inner wall of the cover 220 and mounting base 230.

It will be appreciated that the heating element 210 may be any component known in the art capable of heating the light source chamber 215. In operation, the heating element 210 raises the temperature of the light source chamber 215 in order to control the weather effects on the cover 220. For example, by heating the light source chamber 215, the higher temperature may suitably reduce icing, fogging and snow accumulation on top surface of the cover 220. As earlier discussed with reference to FIG. 1, it will be appreciated that the mounting base 230 may suitably function as a heat sink, alone, or in conjunction with housing 235 in order to protect the longevity of the light source 225.

Figure 3C:
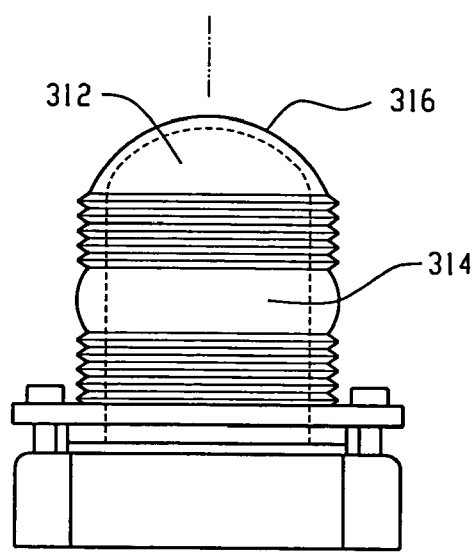
FIG. 3 is a detailed drawing of an elevated edge-light system in accordance with an aspect of the present invention.
Figure 3B:
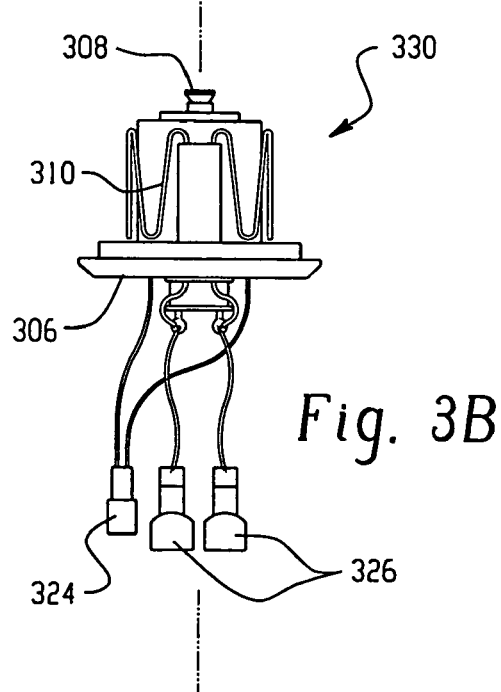
Figure 3A:
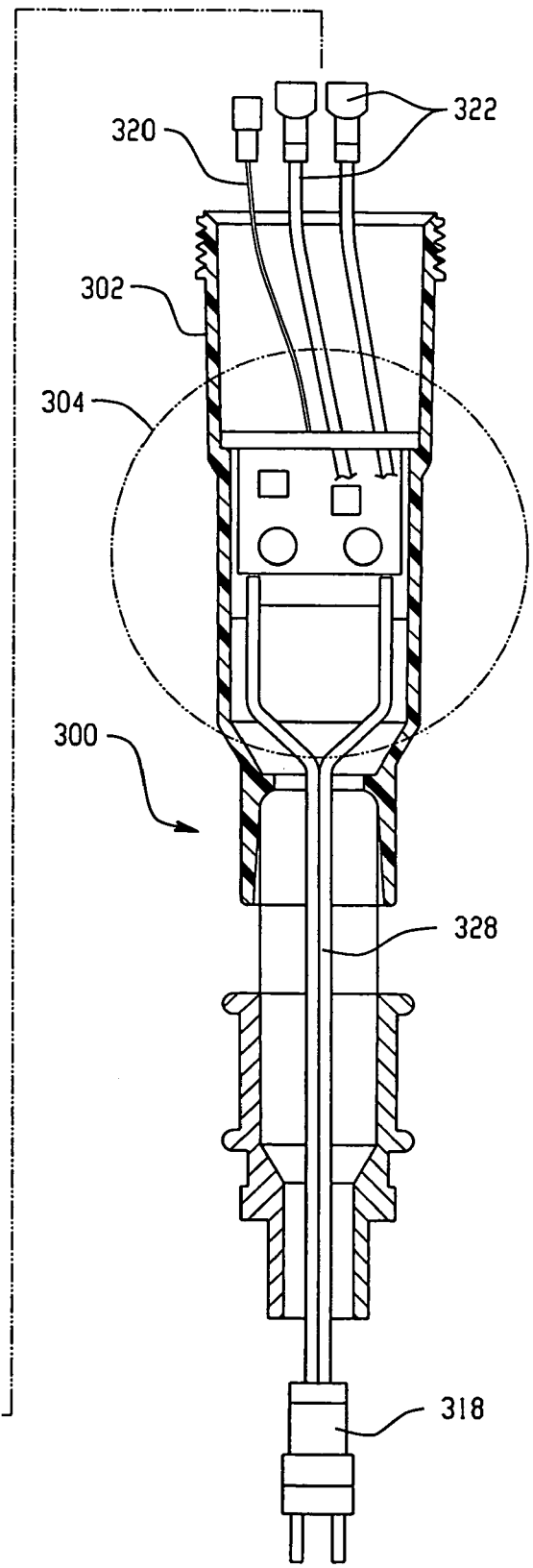

Referring now to FIG. 3, there is are illustrated exploded view drawings of an elevated edge-light system 300 in accordance with an aspect of the present invention. The power supply and electronic circuitry for system 300 are displayed within circle 304. A plug 318 is used to couple system 300 to an external electric power source. Wires 328 conduct the power from plug 318 to the electronic circuitry shown in circle 304.

FIG. 3B shows a mounting assembly 330 in accordance with an aspect of the present invention. The mounting assembly comprises a heat sink 306. At the top of the assembly 330 is a side emitting LED 308. The bottom of assembly 332 is adapted to mount on top 332 of housing 302. Heating element 310 is mounted around mounting assembly 330. Wires 320 and 322 are connected to wires 324 and 326 to provide power to heating element 310 and side emitting LED 308 respectively.

FIG. 3C shows a cutaway view of a cover 312 in accordance with an aspect of the present invention. Cover 312 is suitably adapted to mount on housing 302 and cover mounting assembly 330. Cover 312 has a convex surface 314 that is used to disperse light from side emitting LED 308 corresponding to a desired angle. For example side-emitting LED 308 may be suitably configured to emit light in a 360 degree pattern along a horizontal axis. Convex surface 314 adjusts the light along the horizontal axis to achieve a desired lighting effect. It will be appreciated, that any desired beam pattern may be achieved by utilizing any number of optical techniques. For example, optical manipulating techniques such as depressions and/or apex angles may disposed within the cover 312 in order to refract and/or reflect the light to correspond to any desired beam pattern or predetermined criterion or standard. Cover 312, is comprises of a translucent material capable of transmitting light. In accordance with an aspect of the present invention, cover 312 is manufactured to have the highest transmissivity when used with a monochromatic LED light source. The color of the material (e.g., glass) is tuned to the wavelength of side emitting LED light 308 to obtain the maximum light output. A second convex surface 316 adjusts light along the vertical axis.

Figure 4:
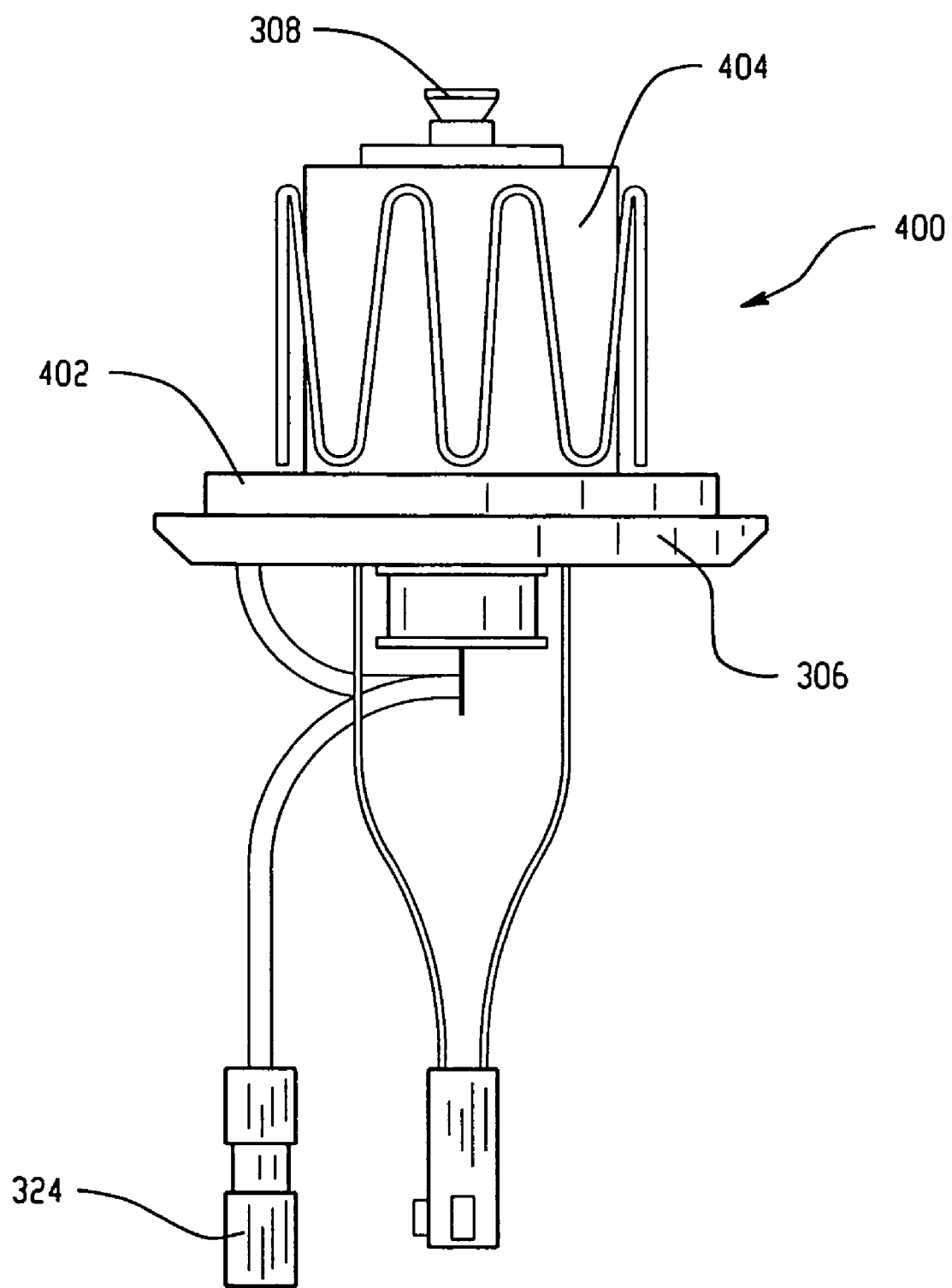
FIG. 4 is a perspective view of a elevated edge-light system using a side emitting light with a heater in accordance with an aspect of the present invention.

FIG. 4 is a detailed view of a mounting unit 400 for a side emitting light with a heater in accordance with an aspect of the present invention. As shown, the mounting unit 400 has a heater support insulator 402 mounted on top of heat sink 308. Insulating paper 404 is between mounting unit 400 and heating element.

FIG. 5 illustrates an elevated edge-light system 500 employing three side emitting light sources in accordance with an aspect of the present invention. The additional light sources can provide additional light intensity such as is required under FAA guidelines for obstruction lights.

Figures 5A, 5B:
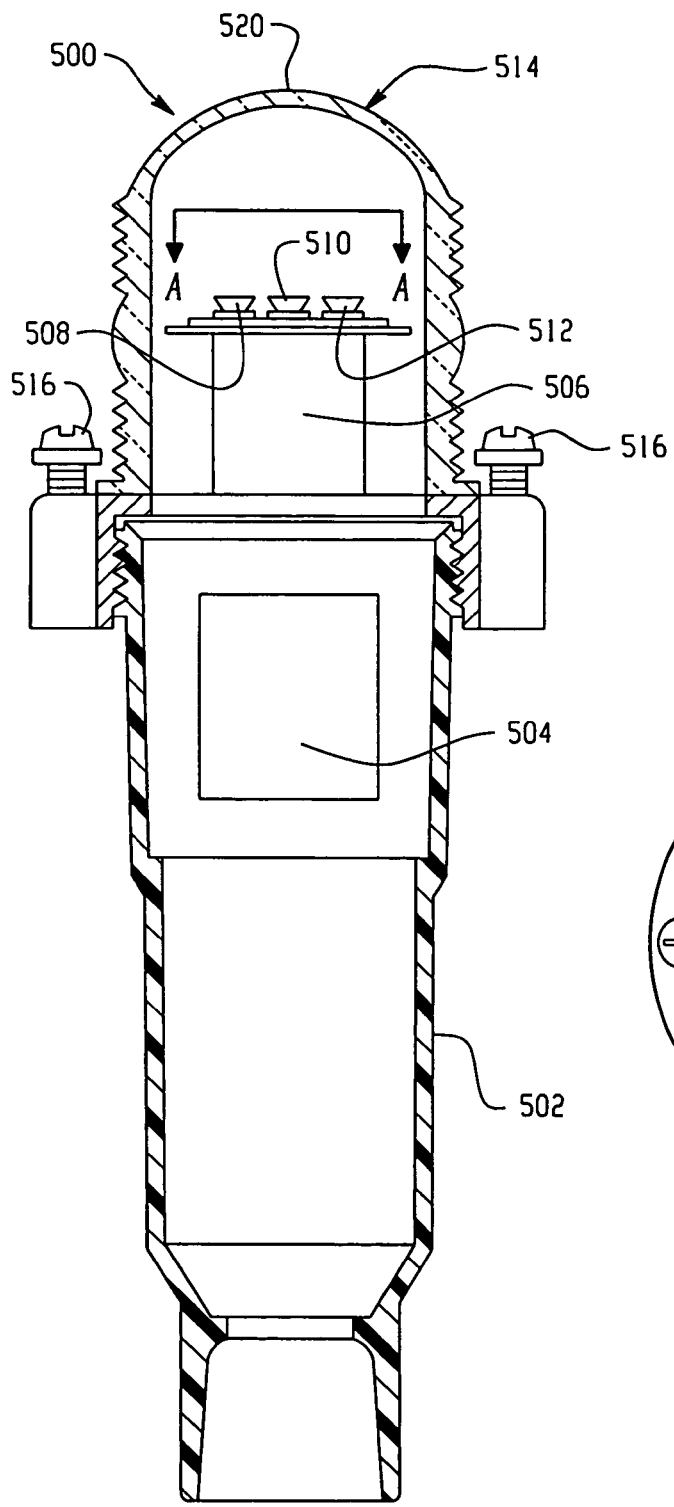
FIG. 5 illustrates an elevated edge-light system employing three side emitting light sources in accordance with an aspect of the present invention.

FIG. 5A is a side view of the system 500 and FIG. 5B is a cutaway top view of the system along lines A—A of FIG. 5A. System 500 comprises a housing 502 that contains an LED electronics module 504. LED electronics module 504 is used for supplying the power to side emitting LED's 508, 510, 512. The power from the LED electronics module 504 can be varied control the intensity of side emitting LED's 508, 510, 512. The wavelength of LEDs 508, 510, 512 is selected to produce a desired output color. LED mounting/heatsink sub assembly 506 is mounted on top of housing 502 and is used for mounting side emitting LED's 508, 510 and 512. Cover 514, an airfield lighting dome, is mounted on top of housing 502 and help in place by screws 516. The color of cover 514 is suitably adapted to match the wavelength of LEDs 508, 510 and 512. Cover 514 has a convex surface 518 for directing light in a direction along a substantially horizontal direction from the sides of side emitting LED's 508, 510, 512. Another convex surface 520 allows light from the top or side of LED's 508, 510, 512 to go in a substantially vertical direction to comply with FAA regulations.

As can be seen from FIG. 5B, side emitting LED's 508, 510, 512 are positioned so that at least two of LED's 508, 510, 512 are visible along a horizontal plane. As shown, the LED's 508, 510, 512 are spaced apart by 120 degrees from a central point 522 and are equidistantly spaced from each other. However, any arrangement that allows at least two of LED's 508, 510, 512 to be visible from any angle when viewed from the ground or in the air above the ground.

Figure 6:
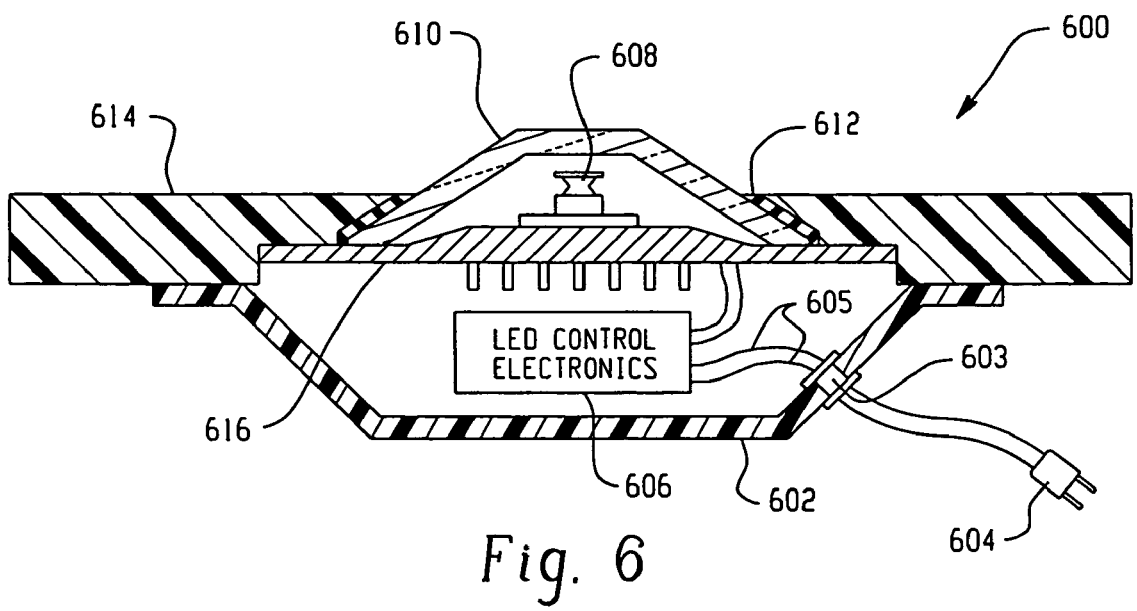
FIG. 6 illustrates an inset edge light system in accordance to an aspect of the present invention.

FIG. 6 illustrates an inset edge light system 600 designed to be installed in pavement in accordance to an aspect of the present invention. An inner bottom cover 602 has an opening 603 for wires 605 to be coupled to plug 604 for supplying power to the LED control electronics 606. LED control electronics 606 comprises electronic circuitry for controlling the current and intensity of side emitting LED 608. Side emitting LED 608 can be any side emitting diode such as a Luxeon LXHL-FB1C or LXHL-FB5C having the desired optical characteristics, e.g., color, intensity. A glass or acrylic dome 610 of constant thickness covers the side emitting diode. Dome 610 is clear since system 600 is designed to be installed in the pavement, thus no visual guidance is given when the light fixture is off. Furthermore, the slope of dome 610 typically ranges from 0 to 20 degrees to comply with FAA regulations and dome 610 is designed to bend the light from side emitting LED 608 at the proper angles, typically 0 to 6 degrees to comply with FAA requirements. Side emitting LED 608 is mounted on prism clamp and LED heatsink 616. Prism clamp and LED heatsink 616 is preferably machined to hold dome 610 in place. Top cover 614 secures dome 610 to the surface of prism clamp and LED heatsink 616, and secures prism clamp and LED heatsink 616 to bottom cover 602. Sealing gasket 612 sealingly engages dome 610 with top cover 614 and prevents external contaminants, such as rain, ice or snow, from getting inside system 600.

Dome 610 is configured to bend the light from side emitting diode 608 at the desired angles. For example, by making the slope of dome 610 approximately 20 degrees and using a 5 W, the results illustrated in Table 1 are obtained.

TABLE 1

| Degrees vertical | Candela |
| --- | --- |
| 0 | 3.1 |
| 1 | 3.4 |
| 2 | 3.9 |

TABLE 1-continued

| Degrees vertical | Candela |
| --- | --- |
| 3 | 4.5 |
| 4 | 5.0 |
| 5 | 5.6 |
| 6 | 4.8 |
| 7 | 4.3 |
| 8 | 3.8 |

Thus, as can be seen form Table 1, the light from side emitting LED 608 is focused at angles of 0 and 8 degrees and complies with FM requirements for an L-852T in-pavement light, which is 2 candelas from 0 to 6 degrees, and 0.2 candela at all other angles. Because side emitting LED 608 is much shorter than a standard incandescent bulb. For example, intensity, the height of dome 610 is lower than for an incandescent bulb. For example, the distance from the top of dome 610 to the top of top cover 614 can be as small as a quarter inch.

Figure 7:
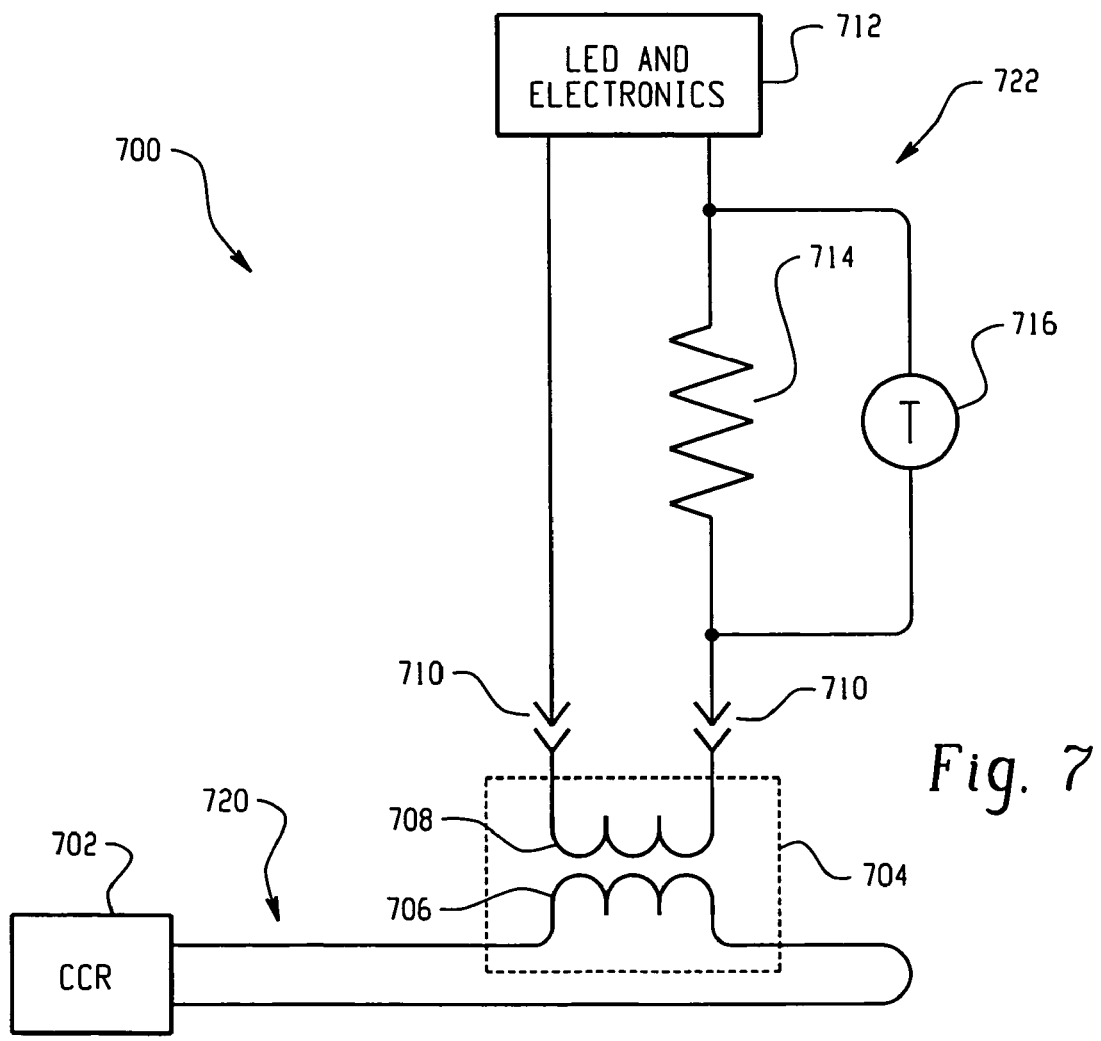
FIG. 7 is a circuit diagram of a heater circuit in accordance with an aspect of the present invention.

FIG. 7 is a circuit diagram of a heater circuit 700 in accordance with an aspect of the present invention. This heater circuit can be employed with lighting systems using a side emitting LED such as heater elements 210 (FIG. 2) 310 (FIG. 3). Because LED's are more efficient in generating photons than an incandescent light, they generate much less heat. Heating the lighting system may be desirable to prevent the accumulation of snow and ice in cold environments.

A constant current source 702 supplies current I to circuit 720. The constant current source can be suitably adapted to supply a constant current at varying levels. For airfield edge lighting circuits, currents varying between 2.8 A and 6.6 A are common. The current I flows into current transformer 704. Current transformer 704 has a primary coil 706 and a secondary coil 708. The ratio of primary coil 706 to secondary coil 708 is selected to obtain the desired constant current in secondary circuit 722. For example, if the ratio of the primary coil to the secondary coil is 1:1, then the current in circuit 722 will be substantially the same as the current in circuit 720. Plug 710 couples circuit 722 to the secondary coil 708 of current transformer 704.

In accordance with an aspect of the present invention, circuit 722 is a circuit comprising a LED with associated electronics 712 in series with a heater element 714. The electronics portion of the LED with associated electronics 712 comprises a power supply that supplies power to the LED based on the current flowing through circuit 722. Thermostat 716 is in parallel with heater element 714. Because a constant current is flowing through circuit 722, the sum of the currents through heater element 714 and thermostat 716 will be constant. When heating is desired, thermostat 716 will provide more resistance, or it can act as an open circuit, to force more current through heater element 714. When heating is not desired, thermostat 716 provides less resistance, or it can act as a short circuit, so that less current will flow through heater element 714. Because circuit 722 is essentially a series circuit comprising LED with associated electronics 712 in series with the combination of heating element 714 and thermostat 716 with a constant current source, the operation of heating element 714 does not effect the operation or intensity of light from the LED because a constant current flows through the LED power supply. Circuit 720 can also have additional current transformers 718 allowing additional lighting systems (not shown) to be connected.

What is claimed is:

1. An airfield light assembly system, comprising:
   a housing;
   a base mounted inside the housing;
   a side emitting light emitting diode mounted on the base;
   a translucent cover mounted on the housing, optically coupled to the side emitting light emitting diode;
   a heating circuit, disposed within the cover and in close communication with the base coupled in series with the side emitting light emitting diode and configured to operate while the light emitting diode is producing light, the heating circuit comprising a heating element and a thermostat for controlling the heating element coupled in parallel to the heating element; and
   a constant current source supplying a constant current to electronics coupled to the side emitting light emitting diode and heating circuit;
   wherein the shape of the cover is adapted to direct the light from the light emitting diode in a desired pattern;
   wherein the color of the translucent cover is matched to the wavelength of the side emitting light emitting diode to provide maximum light output; and
   wherein the side-emitting light emitting diode and cover are suitably adapted to emit at least 2.0 candela of light between approximately 0 to 6 degrees from a horizontal plane parallel with the base.

2. The airfield lighting system of claim 1, the side emitting light emitting diode further comprises three side emitting light emitting diodes.

3. The airfield lighting system of claim 2, wherein the three side emitting light emitting diodes are suitably mounted so that at least two of the diodes are visible at any angle on a horizontal plane extending from the base.

4. A light emitting visual guidance system, comprising:
   a housing;
   a base mounted inside the housing;
   a side emitting light emitting diode mounted on the base;
   a translucent cover mounted on the housing, optically coupled to the side emitting light emitting diode; and
   a heating element disposed within the cover and in close communication with the base, the heating element configured to operate while the side emitting light emitting diode is producing light;
   wherein the shape of the cover is configured to direct the light from the light emitting diode in a desired pattern.

5. The system of claim 4, wherein the color of the translucent cover is matched to the wavelength of the side emitting light emitting diode to provide maximum light output.

6. The system of claim 4, wherein the cover has a convex surface for dispersing light approximately 0 to 6 degrees from a horizontal plane extending from the base.

7. The system of claim 4, wherein the cover has a slope adapted for dispersing light approximately 0 to 6 degrees from a horizontal plane extending from the base.

8. The system of claim 4, wherein the side emitting light emitting diode has an output of at least 20 lumens.

9. The system of claim 4, the system is an obstruction light system and the side emitting light emitting diode further comprises three side emitting light emitting diodes.

10. The system of claim 9, wherein the three side emitting light emitting diodes are suitably mounted so that at least two of the diodes are visible at any angle on a horizontal plane extending from the base.

11. The system of claim 10, wherein the three side emitting diodes are suitably mounted to be equidistant from each other.

12. The system of claim 4, wherein the base is a heat-sink.

13. The system of claim 4, wherein the side-emitting light emitting diode and cover are suitably adapted to emit light approximately 0 to 6 degrees from a horizontal plane parallel with the base.

14. The system of claim 4, wherein light is dispersed from the side-emitting light emitting diode in a 360-degree pattern.

15. The system of claim 4, further comprising a thermostat for controlling the heating element.

16. The system of claim 15, wherein the thermostat is coupled in parallel with the heating element.

17. The system of claim 16, wherein the thermostat and heating element form a heating circuit that is coupled in series with the side emitting light emitting diode.

18. The system of claim 17, further comprising a constant current source supplying a constant current to the heating circuit.

19. The system set forth in claim 4, further comprising an extension connected to the housing for elevating the light assembly above a mounting surface, whereby the light assembly and the extension are in a substantially vertical alignment.

20. The system set forth in claim 19, wherein the extension includes a frangible portion that fractures according to predetermined criterion.

21. The system set forth in claim 4, further comprising the housing being suitably adapted to be at least one of installed directly in the ground, installed directly in pavement, and mounted on top of a standard FAA light base and transformer housing.

22. The system set forth in claim 4, the slope of the top surface of the light fixture which protrudes above finish grade, is a maximum of about 20° and top surface protruding no more than approximately 0.25 inches above a top cover.

23. The system set forth in claim 21, wherein the translucent cover is clear and the side emitting light emitting diode emits a blue light of at least 20 lumens.

* * * * *